US008818193B2

(12) United States Patent
Chen et al.

(10) Patent No.: US 8,818,193 B2
(45) Date of Patent: Aug. 26, 2014

(54) MULTICHANNEL TUNABLE OPTICAL DISPERSION COMPENSATOR

(75) Inventors: Fan Chen, Shanghai (CN); Yongkang Hu, Shanghai (CN); Zhenli Wen, Shanghai (CN); Dongshen Han, Zhuhai (CN); Fahua Lan, Shanghai (CN); Kevin Dapeng Zhang, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 829 days.

(21) Appl. No.: 12/569,134

(22) Filed: Sep. 29, 2009

(65) Prior Publication Data

US 2011/0076023 A1 Mar. 31, 2011

(51) Int. Cl.
*H04J 14/02* (2006.01)
*H04B 10/00* (2013.01)
*H04B 10/12* (2006.01)
*H04B 10/04* (2006.01)

(52) U.S. Cl.
USPC ............ 398/81; 398/119; 398/136; 398/147; 398/148; 398/149; 398/150; 398/192; 398/198

(58) Field of Classification Search
CPC .............. H04B 10/25; H04B 10/2507; H04B 10/25073; H04B 10/2513; H04B 10/25133; H04B 10/2519; H04B 10/2531
See application file for complete search history.

(56) References Cited

U.S. PATENT DOCUMENTS

| 5,359,451 | A  | * | 10/1994 | Gelbart et al. | 359/285 |
|-----------|----|---|---------|----------------|---------|
| 7,170,661 | B2 | * | 1/2007  | Ogasawara et al. | 359/22 |
| 2001/0021053 | A1 | * | 9/2001 | Colbourne et al. | 359/161 |
| 2002/0041414 | A1 | * | 4/2002 | Oguma | 359/130 |
| 2003/0011847 | A1 | * | 1/2003 | Dai et al. | 359/161 |
| 2003/0178914 | A1 | * | 9/2003 | Ogawa et al. | 310/311 |
| 2003/0210727 | A1 | * | 11/2003 | Frisken et al. | 372/92 |
| 2006/0133817 | A1 | * | 6/2006 | Xie | 398/161 |

* cited by examiner

*Primary Examiner* — Darren E Wolf
(74) *Attorney, Agent, or Firm* — Maschoff Brennan

(57) ABSTRACT

An embodiment of the invention includes a tunable optical dispersion compensator (TODC) comprising a first beam displacer on an optical path, wherein the first beam displacer separates an optical signal into a first beam and a second beam, and one or more polarizing beam splitters on the optical path, wherein the one or more polarizing beam splitters keep the first beam and the second beam on the optical path. The TODC also comprises one or more etalons on the optical path, wherein the one or more etalons are tunable to introduce a group delay in the first beam and the second beam, and a reflecting mirror on the optical path, wherein the reflecting mirror returns the optical signal back along the optical path. The TODC further comprises a second beam displacer, wherein the second beam displacer combines the first beam and the second beam into an output optical signal.

20 Claims, 7 Drawing Sheets

MULTICHANNEL TUNABLE OPTICAL DISPERSION COMPENSATOR

CROSS-REFERENCE TO RELATED APPLICATIONS

Not applicable.

BACKGROUND OF THE INVENTION

Optical networks are an increasingly important part of today's communication networks. Optical networks use optical fibers to enable faster, more accurate, communication. An optical fiber (or fibre) is a glass, plastic, or other transparent fiber that carries light along its length. Optical fibers are widely used in fiber-optic communications, which permits transmission over longer distances and at higher data rates (a.k.a. "bandwidth") than other forms of communications. Fibers are used instead of metal wires because signals travel along fibers with less loss, and fibers are also immune to electromagnetic interference. Specially designed fibers are used for a variety of other applications, including sensors and fiber lasers.

Light is kept in the "core" of the optical fiber by total internal reflection. This causes the fiber to act as a waveguide. Fibers which support many propagation paths or transverse modes are called multi-mode fibers (MMF). Fibers which can only support a single mode are called single-mode fibers (SMF). Multi-mode fibers generally have a larger core diameter, and are used for short-distance communication links and for applications where high power must be transmitted. Single-mode fibers are used for most communication links longer than 200 meters.

Differing propagation speeds for different wavelengths of light leads to a problem in optical networks called dispersion. Dispersion causes pulses to spread in optical fibers, degrading signals over long distances and possibly introducing errors. Dispersion is sometimes called chromatic dispersion to emphasize its wavelength-dependent nature.

Optical fibers, like any other material, have a refractive index. The refractive index (or index of refraction) of a medium is a measure of how much the speed of light is reduced inside the medium. The larger the index of refraction, the more slowly light travels in that medium. For example, typical soda-lime glass has a refractive index of 1.5, which means that in soda-lime glass, light travels at 1/1.5=0.67 times the speed of light in a vacuum. Two common properties of glass and other transparent materials are directly related to their refractive index. First, light rays may change direction when they cross the interface from one material to another material, an effect that is used in lenses. Second, light reflects wholly or partially from surfaces that have a refractive index different from that of their surroundings.

An optical fiber consists of a core surrounded by a cladding layer. To confine the optical signal in the core, the refractive index of the core must be greater than that of the cladding. This produces total internal reflection, which keeps the optical signal within the core of the fiber. The boundary between the core and cladding may either be abrupt, in step-index fiber, or gradual, in graded-index fiber. A typical value for the cladding of an optical fiber can be 1.46. A typical value for the core of an optical fiber can be 1.48.

In general, the refractive index is some function of the frequency f of the light, thus n=n(f), or alternatively, with respect to the wave's wavelength n=n($\lambda$). I.e., in general, the refractive index of a material is not a set value for all wavelengths. Instead, the refractive index varies according to the wavelength of the light transmitted. Therefore, in general, light of different wavelengths may propagate at different speeds through an optical fiber. The phase velocity, or propagation velocity, v, of an electromagnetic wave in a given, uniform, medium is given by $$v = \frac{c}{n}$$

where c is the speed of light in a vacuum and n is the refractive index of the medium.

There are generally two sources of dispersion: material dispersion and waveguide dispersion. Material dispersion comes from a frequency-dependent response of a material to waves. For example, material dispersion leads to undesired chromatic aberration in a lens or the separation of colors in a prism. Waveguide dispersion occurs when the speed of a wave in a waveguide (such as an optical fiber) depends on its frequency for geometric reasons, independent of any frequency dependence of the materials from which the waveguide is constructed. More generally, waveguide dispersion can occur for waves propagating through any inhomogeneous structure (e.g. a photonic crystal), whether or not the waves are confined to some region. In general, both types of dispersion may be present, although they are not strictly additive.

The combination of material dispersion and waveguide dispersion can lead to signal degradation in optical fibers, because the varying delay in arrival time between different components of a signal "smears out" the signal in time. Signal degradation, in turn, can introduce errors into the signal.

One method of removing dispersion involves converting the optical signal to an electric signal. The electric signal is then corrected and converted back to an optical signal. However, this process is time consuming relative to the speed at which optical networks operate. Therefore, there is a need for devices that can perform dispersion correction on the optical signal itself.

BRIEF SUMMARY OF THE INVENTION

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

An embodiment of the invention includes a tunable optical dispersion compensator (TODC) comprising a first beam displacer on an optical path, wherein the first beam displacer separates an optical signal into a first beam and a second beam, and one or more polarizing beam splitters on the optical path, wherein the one or more polarizing beam splitters keep the first beam and the second beam on the optical path. The TODC also comprises one or more etalons on the optical path, wherein the one or more etalons are tunable to introduce a group delay in the first beam and the second beam, and a reflecting mirror on the optical path, wherein the reflecting mirror returns the optical signal back along the optical path. The TODC further comprises a second beam displacer, wherein the second beam displacer combines the first beam and the second beam into an output optical signal.

Another embodiment of the invention includes a method of compensating for chromatic dispersion of an optical signal, the method comprising receiving the optical signal and separating the optical signal into a first beam and a second beam, wherein the polarization state of the first beam is different than the polarization state of the second beam. The method also comprises changing the polarization state of the first beam to match the polarization state of the second beam and producing group delay in the first beam and the second beam, wherein the group delay is configured to compensate for the chromatic dispersion of the optical signal. The method further comprises combining the first beam and the second beam into an output optical signal and transmitting the output optical signal.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are, therefore, not to be considered limiting of its scope. The invention will be described and explained with additional specificity and detail through the use of the accompanying drawings in which.

DETAILED DESCRIPTION OF THE PREFERRED EMBODIMENTS

Optical networks run at very high speeds, sometimes at speeds of 10 GHz (10 Billion signals per second), 40 GHz, or more. Often optical signals are received or transmitted at transceivers where optical signals are converted to electrical signals and vice versa. As used herein, the term "optical signal" can be used to refer to signals composed of visible light, infrared light, ultraviolet light, or any other electromagnetic radiation unless otherwise specified.

Transceivers can be placed either in-line or at the receiver end of the network. The high speed of optical networks can lead to greater dispersion within optical networks. Additionally, optical networks continue to increase in size. Increased size can also lead to additional dispersion. Because of size and speed limitations a passive device that can correct for dispersion is highly beneficial. Such a device allows high speed communication to continue while eliminating the need for electronic correction, which is much slower than optical correction as disclosed herein. Additionally, such a device capitalizes on the advantages of optical signals, namely increased transmission speed and low error rate.

I. Tunable Optical Dispersion Compensator

Figure 1A:
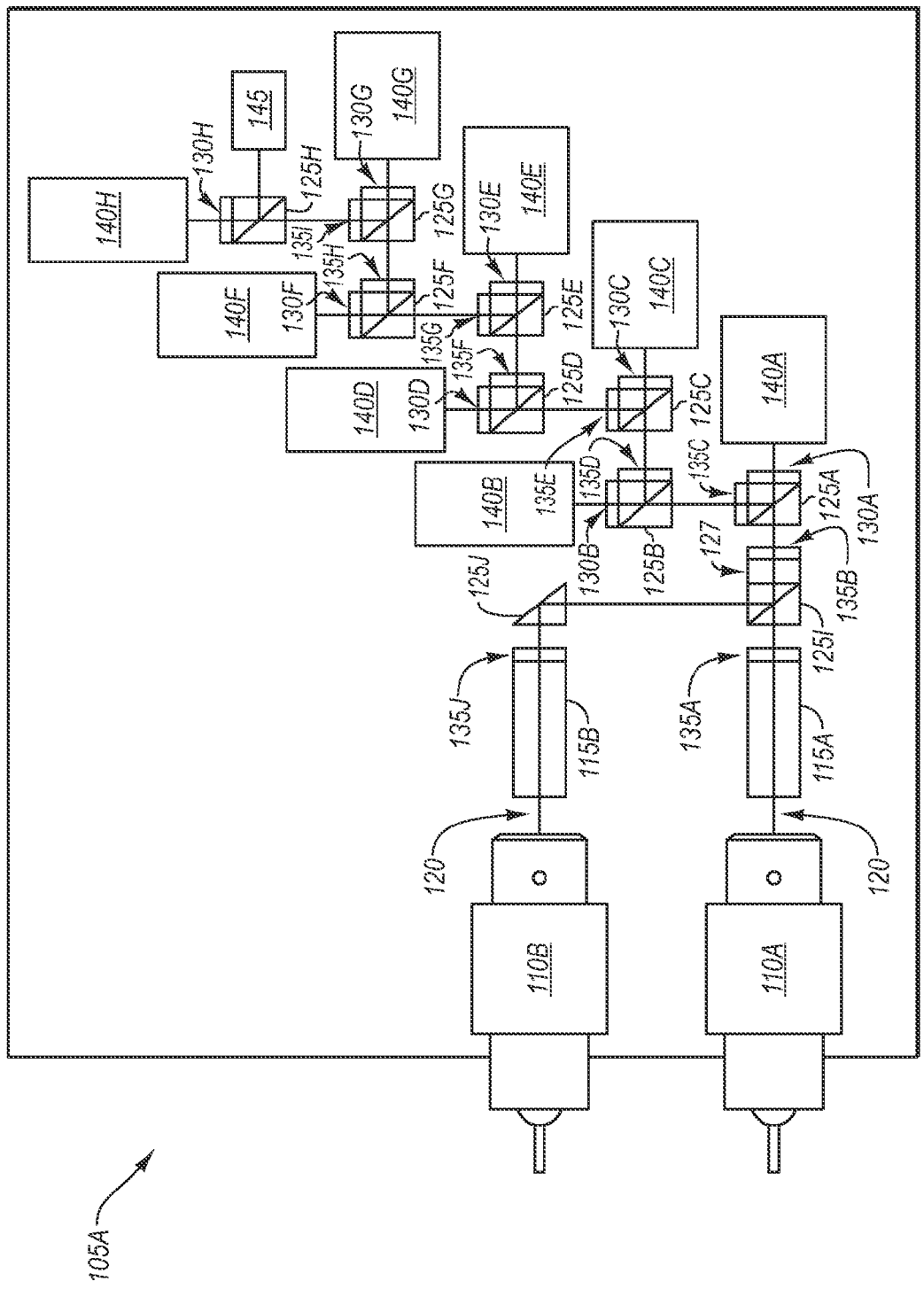
FIG. 1A illustrates an example of a tunable optical dispersion compensator.
Figure 1B:
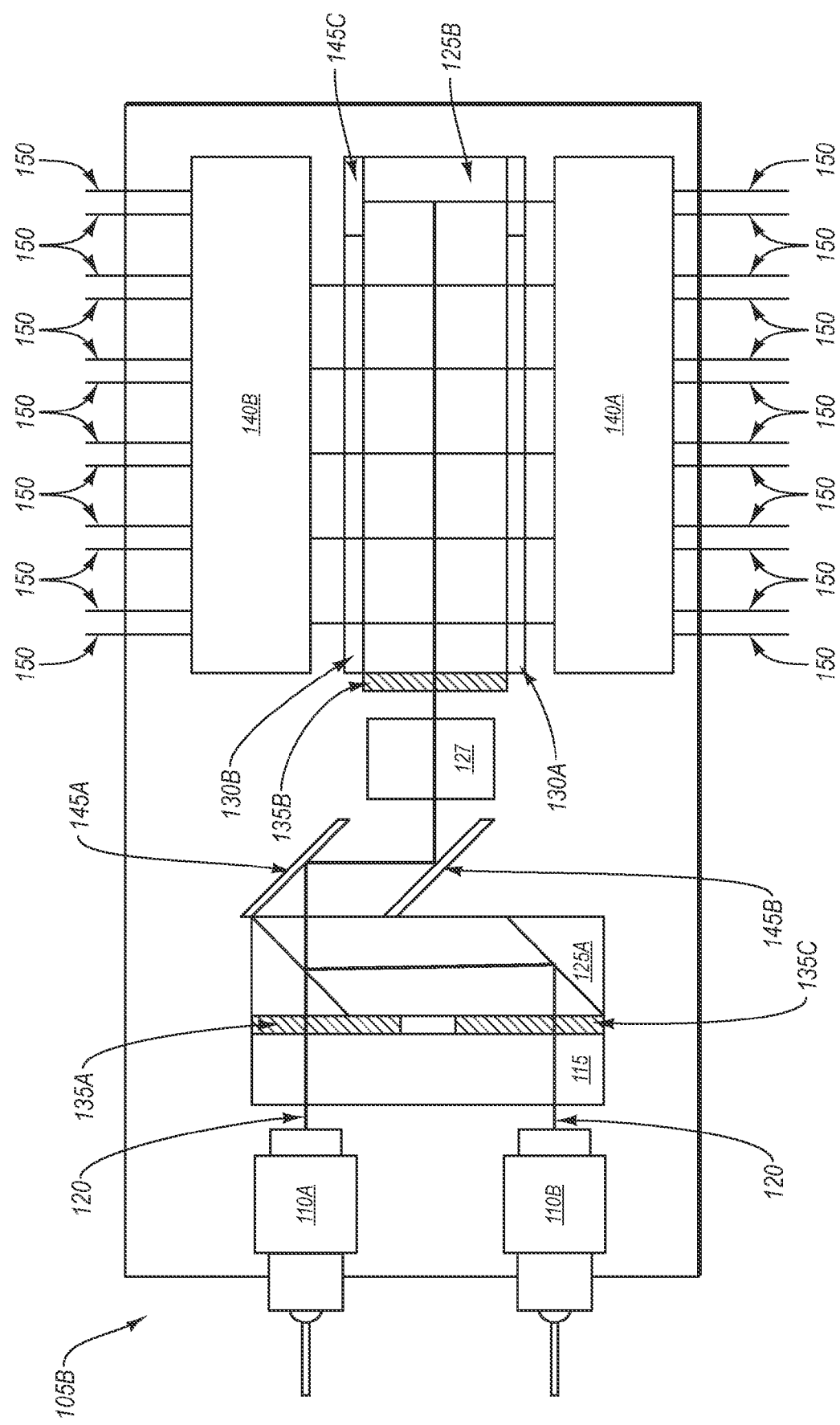
FIG. 1B illustrates an alternative example of a tunable optical dispersion compensator.

FIGS. 1A and 1B illustrate an example of a tunable optical dispersion compensator (TODC) 105. FIG. 1A illustrates one example arrangement of a TODC 105A. In some embodiments, the TODC 105A can produce a group delay. Group delay is a measure of the transit time of a signal through a device under test (DUT), versus frequency. Group delay can be a useful measure of phase distortion, and can be calculated by differentiating the insertion phase response of the DUT versus frequency. I.e., group delay is a measure of the slope of the transmission phase response. The linear portion of the phase response is converted to a constant value (representing the average signal-transit time) and deviations from linear phase are transformed into deviations from constant group delay. The variations in group delay cause signal distortion, just as deviations from linear phase cause distortion. Group delay can be another way to look at linear phase distortion. That is, group delay produces a varying amount of phase delay, based on the wavelengths of the input signals. I.e. group delay is dispersion of the signal.

If the group delay of the TODC 105A is configured to be equal and opposite to the dispersion experienced by an optical signal from an optical network, the output signal can be substantially similar to the original signal. That is, the TODC 105A compensates for the dispersion of the signal caused by an optical fiber by introducing an equal and opposite dispersion, such that all wavelengths of light experience an equal amount of delay after passing through the network and TODC 105A.

FIG. 1A shows that the TODC 105A includes a first single fiber (SF) collimator 110A for receiving an input optical signal and a second SF collimator 110B for transmitting an output optical signal. A collimator is a device that narrows a beam of particles or waves. To "narrow" can mean either to cause the directions of motion to become more aligned in a specific direction (i.e. parallel) or to cause the spatial cross section of the beam to become smaller. In some embodiments, the first SF collimator 110A can focus an optical signal from an optical fiber to another medium, such as air, and the second SF collimator 110B can focus an optical signal from a medium, such as air, onto an optical fiber.

Figure 2:
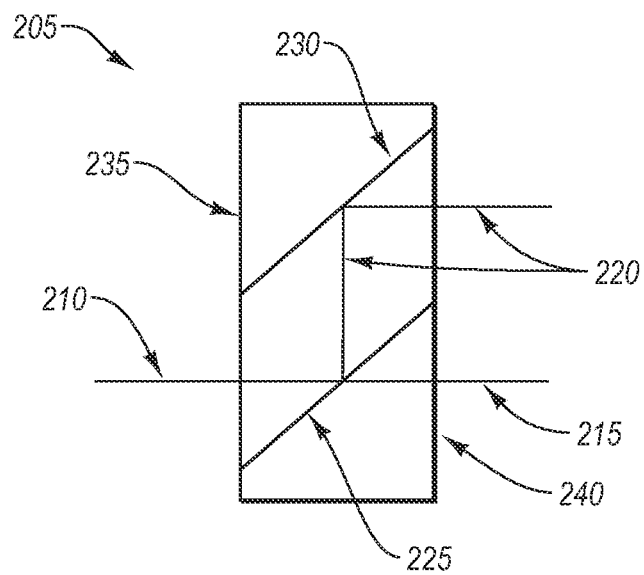
FIG. 2 illustrates an example of a polarization beam displacer.

The TODC 105A also includes a first beam displacer 115A and a second beam displacer 115B along an optical path 120. The optical path 120 can be a free space optical path or can include any other path through which an optical signal can travel. In some embodiments, the beam first beam displacer 115A and second beam displacer 115B can include a polarization beam displacer. FIG. 2 illustrates an example of a polarization beam displacer 205. A polarization beam displacer 205 can separate the input optical signal 210 into two beams 215 and 220 with different polarizations which exit parallel to one another. Alternatively, in the reverse direction, the polarization beam displacer 205 can combine the two beams 215 and 220, with different polarizations, into a single optical signal 210. In some embodiments, the first beam 215 will be linearly polarized and the second beam 220 will be circularly polarized. In other embodiments, the first beam 215 will be circularly polarized and the second beam 220 will be linearly polarized. When separating the input optical signal 210, the first beam 215 can transmit straight through the polarization beam displacer 205, while the second beam 220 will be reflected by the surface 225 and the surface 230 and emerge parallel to the first beam 215. The amount of beam displacement (the distance between the first beam 215 and the second beam 220) can vary with wavelength. The polarization beam displacer 205 can be oriented with the entrance face 235 and the exit face 240 parallel to one another and inclined at some angle to the optic axis of the beam displacer 205 to maximize the amount of displacement.

Returning to FIG. 1A, the TODC 105A also includes polarizing beam splitters 125 along the optical path 120. The polarizing beam splitters 125 can be used to keep the first beam and the second beam on the optical path 120. A beam splitter is an optical device that splits a beam of light into two beams of light; therefore, a polarizing beam splitter separates light into beams of differing polarization. As used herein, the term "light" can be used to refer to visible light, infrared light, ultraviolet light, or any other electromagnetic radiation unless otherwise specified.

Figure 3:
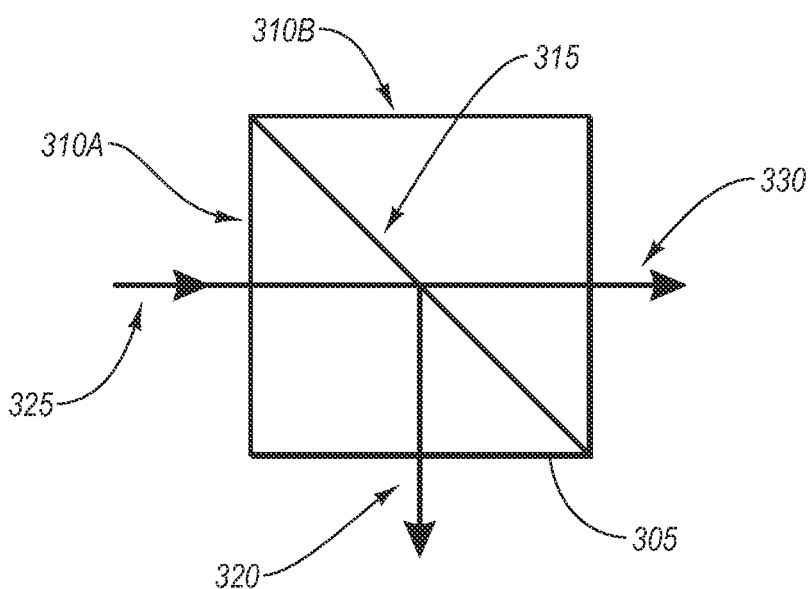
FIG. 3 illustrates an example of a beam splitter.

FIG. 3 illustrates an example of a beam splitter 305. In some embodiments, a beam splitter 305 includes a cube made from two triangular glass prisms 310A and 3106 which are glued together at their base using a resin layer 315. The thickness of the resin layer 315 is adjusted such that (for a certain wavelength) a first portion 320 of the light 325 incident through one "port" (i.e. face of the cube) is reflected, or redirected, and a second portion 330 is transmitted.

In other embodiments, a beam splitter includes a half-silvered mirror. A half-silvered mirror includes a plate of glass with a thin coating of aluminum (usually deposited from aluminum vapor) with the thickness of the aluminum coating such that, of light incident at a 45 degree angle, one portion is transmitted and one portion is reflected, or redirected. Instead of a metallic coating, a dielectric optical coating may be used.

Polarization is a property of waves that describes the orientation of their oscillations. For electromagnetic waves the polarization is described by specifying the direction of the wave's electric field. According to the Maxwell equations, the direction of the magnetic field is uniquely determined for a specific electric field distribution and polarization.

Electromagnetic waves can be separated into three different polarization states. In the first (linear), the two orthogonal components of the electric field (the "x" component and the "y" component—with the electric field traveling along the "z" axis) are in phase; i.e. the minimum and maximum of the two components occur at the same z-coordinate. In this case, the ratio of the amplitudes of the two components is constant, so the direction of the electric vector (the vector sum of these two components) is constant. Since the tip of the vector traces out a single line in a plane, this special case is called linear polarization. The direction of this line depends on the relative amplitudes of the two components.

In the second polarization state (circular), the two orthogonal components of the electric field have exactly the same amplitude and are exactly ninety degrees out of phase; i.e. in circular polarization one component is zero when the other component is at maximum or minimum amplitude and vice versa. There are two possible phase relationships that satisfy this requirement: (1) the x component can be ninety degrees ahead of the y component; or (2) the x component can be ninety degrees behind the y component. In circular polarization the electric vector traces out a circle in a plane. The direction the field rotates depends on which of the two phase relationships exists. These cases are called right-hand circular polarization and left-hand circular polarization, depending on which way the electric vector rotates.

In all other cases, where the two components are not in phase and either do not have the same amplitude and/or are not ninety degrees out of phase, the polarization is called elliptical polarization because the electric vector traces out an ellipse in a plane (the polarization ellipse). In general, linear polarization and circular polarization are special cases of elliptical polarization. Additionally, light that is elliptically polarized can be divided into two components, one that is linearly polarized and a second that is circularly polarized.

Different coordinate systems may be used to represent the components of the electric field. In some embodiments, the coordinate system used relates to the plane made by the propagation direction and a vector normal to the plane of a reflecting surface. This is known as the plane of incidence. The component of the electric field parallel to this plane is termed P-like (parallel) and the component perpendicular to this plane is termed S-like (from senkrecht, German for perpendicular). Light with a P-like electric field can be said to be P-polarized, pi-polarized, tangential plane polarized, or can be said to be a transverse-magnetic (TM) wave. P-polarized light is circularly polarized light. Light with an S-like electric field can be said to be S-polarized, also known as sigma-polarized or sagittal plane polarized, or can be called a transverse-electric (TE) wave. S-polarized light is linearly polarized light.

Polarizing beam splitters (or beam splitting polarizers), such as the Wollaston prism, use birefringent materials, splitting light into beams of differing polarization. For an ideal polarizing beam splitter these would be fully polarized, with orthogonal polarizations. Beam splitting polarizers do not need to absorb and dissipate the energy of the rejected polarization state; therefore, beam splitting polarizers can be more suitable for use with high intensity beams, such as laser light, than other polarizers. True polarizing beam splitters can also be useful where the two polarization components are to be analyzed or used simultaneously. Polarizing beam splitters can be used to selectively transmit a beam or reflect, or redirect, the beam if the beam has single polarization state (linear or circular). That is, a single polarizing beam splitter can be used to transmit a linearly polarized beam and to reflect, or redirect, a circularly polarized beam or vice versa.

Returning to FIG. 1A, the polarizing beam splitters 125 can be a beam splitting cubes with a birefringent material. However, one of skill in the art will appreciate that any device that either transmits or reflects, or redirects, a beam of light based on the beams polarization can be used as the polarizing beam splitters 125 in the TODC 105A.

In some embodiments, the polarizing beam splitters 125 may include a garnet 127 and a quarter-wave plate 130 or a half-wave plate 135. Garnet is a mineral that can be used as gemstones and abrasives. Garnets are most often seen in red, but are available in a wide variety of colors spanning the entire spectrum. A wave plate, or retarder, is an optical device that alters the polarization state of a light wave travelling through the wave plate. A wave plate works by shifting the phase of the light wave between two perpendicular polarization components. A typical wave plate can be a birefringent crystal with a carefully chosen orientation and thickness. For example, a quarter-wave plate creates a quarter-wavelength phase shift and can change linearly polarized light to circular and vice versa. Another type of wave plate is a half-wave plate, which retards one polarization by half a wavelength, or 180 degrees. I.e., a half-wave plate rotates the polarization direction of polarized light (change the direction of linearly polarized light or the rotation of circularly polarized light). Wave plates can be unidirectional; i.e. a wave plate can change polarization when light is traveling in one direction, and leave the polarization unchanged when light is travelling in the opposite direction.

In some embodiments, a polarizing beam splitter 125 can have a quarter-wave plate 130 or a half-wave plate 135 associated with the polarizing beam splitter 125. A polarizing beam splitter 125 in combination with a quarter-wave plate 130 or a half-wave plate 135 can be used to direct a beam of light on the optical path 120. For example, light that is transmitted through a polarizing beam splitter 125 can encounter a quarter-wave plate 130. If the quarter-wave plate 130 is unidirectional, the light can have its polarization state unchanged. If the light is then returned to the quarter-wave plate 130 with the propagation direction reversed, the light can have its polarization state changed before entering the polarizing beam splitter 125, which will now reflect, or redirect, the light.

The quarter-wave plates 130 can change the polarization of a beam of light from linear to circular or vice versa, depending on the quarter-wave plate. Changing the polarization of a beam can make a beam that was previously transmitted through a polarizing beam splitter 125 be reflected, or redirected, on subsequent encounters with the polarizing beam splitter 125. Likewise, changing the polarization of a beam can make a beam that was previously reflected, or redirected, at a polarizing beam splitter 125 be transmitted on subsequent encounters with the polarizing beam splitter 125.

The TODC also includes Gires-Tournois (GT) etalons 140. The term etalon is often used interchangeably with the term interferometer. Typically an etalon is a transparent plate with two reflecting surfaces and an interferometer is two parallel highly reflecting mirrors. As used herein, the term etalon may refer to an etalon, an interferometer or any other device which serves substantially the same purpose.

In some embodiments, a GT etalon 140 is a transparent plate with two reflecting surfaces, one of which has very high reflectivity. Due to multiple-beam interference, light incident on the lower-reflectivity surface of a GT etalon 140 is (almost) completely reflected, but has a phase shift that depends strongly on the wavelength of the light. GT etalons are closely related to Fabry-Pérot (FP) etalons.

Figure 4A:
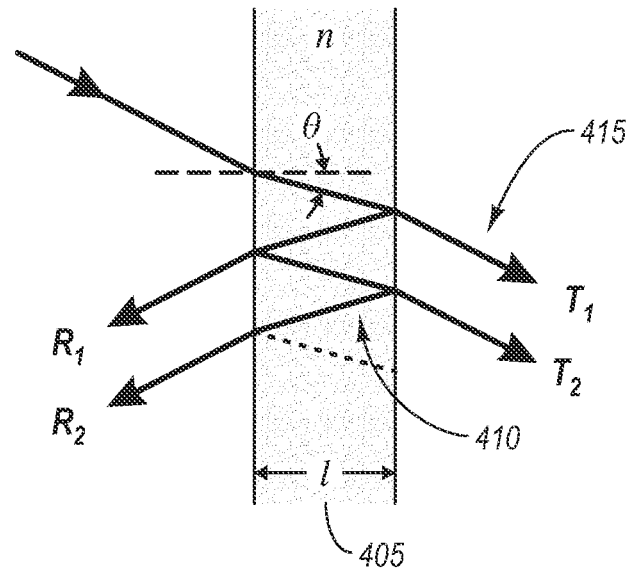
FIG. 4A illustrates an example of an etalon.

FIG. 4A illustrates an etalon 405. Recent advances in fabrication technique allow the creation of very precise tunable etalons 405. The varying transmission function of the etalon 405 is caused by interference between the multiple reflections of light 410 between the two reflecting surfaces. Constructive interference occurs if the transmitted beams 415 are in phase, and this corresponds to a high-transmission peak of the etalon. If the transmitted beams are out-of-phase, destructive interference occurs and this corresponds to a transmission minimum. Whether the multiply-reflected beams are in-phase or not depends on the wavelength ($\lambda$) of the light (in vacuum), the angle the light travels through the etalon ($\theta$), the thickness of the etalon (l) and the refractive index of the material between the reflecting surfaces (n).

Figure 4B:
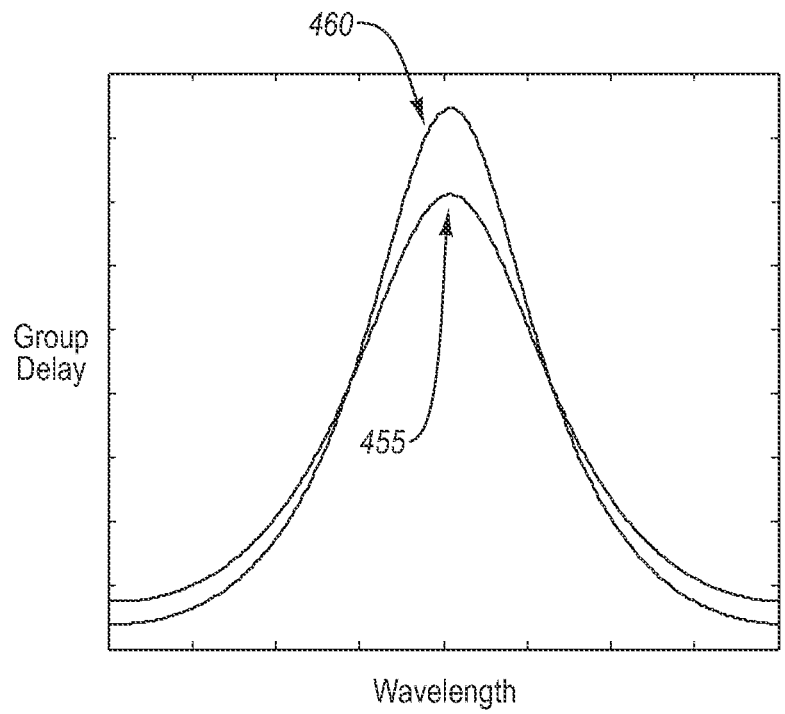
FIG. 4B illustrates an example of a transmission spectrum of a first etalon and a second etalon.

FIG. 4B illustrates the group delay curve 450 of a first GT etalon 455 and a second GT etalon 460. The group delay curve 450 as a function of wavelength exhibits peaks of large delay corresponding to resonances of the etalons 455 and 460. The group delay curve of the first etalon 455 represents the group delay curve of an etalon with low finesse (F). The group delay curve of the second etalon 460 represents the group delay curve of an etalon with high finesse. Etalons with high finesse show sharper delay peaks with lower minimum transmission coefficients than etalons with low finesse. The wavelength separation between adjacent transmission peaks, as measured in wavelength, ($\Delta\lambda$) is called the free spectral range (FSR) of the etalon.

Solid etalons are flat, very parallel optical components. In some embodiments, solid etalons can be made from fused silica. Solid etalons are prone to at least two forms of temperature instability; both the refraction index of the material (n) and the physical thickness of the etalon material (l) change with temperature. Air spaced etalons reduce this problem by using air as the etalon medium; this greatly reduces the change in index with temperature. The mirror spacing can be determined by spacers that may be made from fused silica, ULE, Zerodur or from other materials.

Etalons may be tunable; that is, the wavelengths around which the maxima occur and/or the FSR can be adjusted. There are a number of methods for tuning etalons including tilting the entire etalon, moving the mirrors, changing the refraction index of the medium (using pressure, temperature, electrostatic or other means) and other methods. Tilt tuning is a simple tuning technique, as the etalon is tilted the FSR changes with the cosine of the angle. However, the output of the etalon can be smeared by tilting since each successive "bounce" is moved laterally along the etalon. Other tuning techniques can maintain a plane parallel structure and change the effective length of the etalon. In some embodiments, this can be done by using a piezoelectric spacer in an air spaced etalon to change the spacing of the etalon. In other embodiments, tuning can be thermal and the tuning may involve changing the refractive index of the medium, the spacing, or both.

Figure 5:
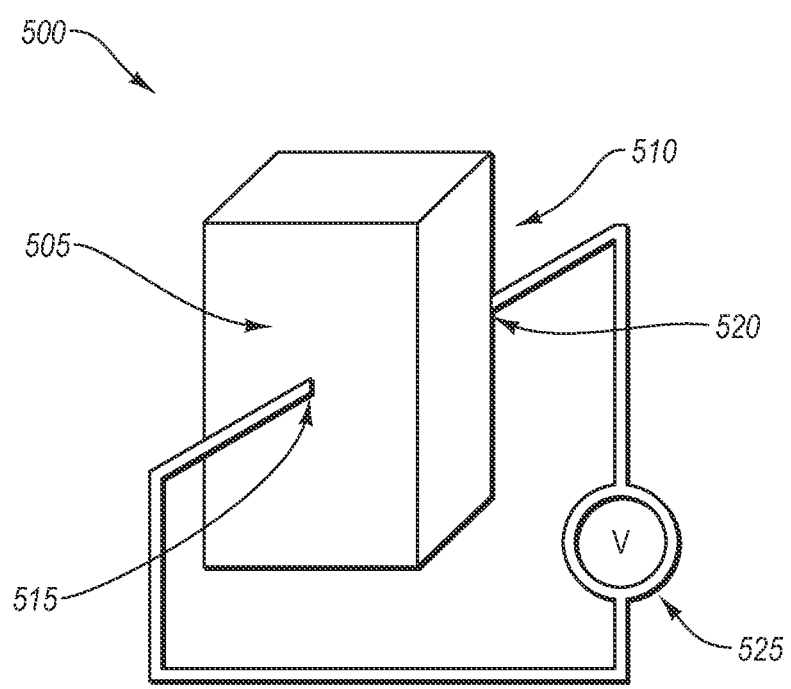
FIG. 5 illustrates an example of an electronically tunable GT etalon.

FIG. 5 illustrates an example of an electronically tunable GT etalon 500. The electronically tunable GT etalon 500 can include a piezoelectric material. For example, the electronically tunable GT etalon 500 can include a lead magnesium niobate-lead titanate (PMN-PT) crystal. A piezoelectric material is one that can generate an electric potential in response to applied mechanical stress. This can take the form of a separation of electric charge across the crystal lattice. If the material is not short-circuited, the applied charge can induce a voltage across the material. The piezoelectric effect is reversible in that piezoelectric materials produce stress and/or strain in the material when an electric field is applied. I.e., a piezoelectric material becomes deformed if an electric field is applied to the piezoelectric material.

The electronically tunable GT etalon 500 includes a first face 505 and a second face 510. The first face 505 can have a low reflectivity. For example, the reflectivity of the first face 505 can be 50 percent or less. The second face 510 can have a high reflectivity. For example, the reflectivity of the second face 510 can be 99.8 percent or higher. As described above, different reflectivities in the first face 505 and second face 510 can leads to interference in light passing through the electronically tunable GT etalon 500. This can lead to a change in the group delay of the electronically tunable GT etalon 500, as described below.

The electronically tunable GT etalon 500 can also include a first electrode 515 and a second electrode 520 (on the rear face). The first electrode 515 and the second electrode 520 can be connected to a voltage source 525. The voltage source 525, the first electrode 515 and the second electrode 520 can be used to create an electric field in the electronically tunable GT etalon 500, thus distorting the electronically tunable GT etalon 500 and changed the group delay of the electronically tunable GT etalon 500, as described below.

Returning to FIG. 1A, in some embodiments, the GT etalons 140 of the TODC 105A have equal FSR and group delay curves. Group delay is a measure of the transit time of a signal through a device under test (DUT), versus frequency. Group delay can be a useful measure of phase distortion, and can be calculated by differentiating the insertion phase response of the DUT versus frequency. I.e., group delay is a measure of the slope of the transmission phase response. The linear portion of the phase response is converted to a constant value (representing the average signal-transit time) and deviations from linear phase are transformed into deviations from constant group delay. The variations in group delay cause signal distortion, just as deviations from linear phase cause distortion. Group delay can be another way to look at linear phase distortion. I.e. group delay produces a varying amount of phase delay, based on the wavelengths of the input signals.

If the GT etalons 140 are tunable, then the group delay can be configured to eliminate the chromatic dispersion of the optical signal. I.e., the group delay can be configured to be equal and opposite to the dispersion of the optical signal. E.g., in a highly simplified example, consider an optical signal composed of two wavelengths transmitted over an optical network. If the first optical signal is delayed more than the second optical signal in the optical network, the GT etalons 140 can be configured to delay the second optical signal more than the first signal. If the amount of delay in the GT etalons 140 of the second signal is configured correctly, the total delay of both signals can be equal, thus eliminating the dispersion. In the same way, a series of GT etalons 140 can eliminate dispersion of an optical signal where the wavelength of the signal varies slightly around the central wavelength of the signal. E.g., if a single GT etalon 140 removes a portion of the dispersion in an optical signal, a series of GT etalons 140 can be used to eliminate all dispersion, because the group delay of the individual GT etalons 140 add linearly.

The TODC 105A also includes a high reflectivity mirror 145 along the optical path. In some embodiments, the mirror 145 may have reflectivity greater than 99.85%; i.e. more than 99.85% of the light is reflected, or redirected, by the mirror 145. In some embodiments, the mirror 145 returns the light along the optical path 120 to undergo further group delay and, ultimately, to be output as an undistorted signal.

FIG. 1B illustrates an alternative example arrangement of a TODC 105B relative to the TODC 105A of FIG. 1A. The TODC 105B contains many of the same elements as the TODC 105A, therefore, the elements will not be further explained with regard to FIG. 1B. Rather, only the differences between the TODC 105B and the TODC 105A will be discussed.

The TODC 105B contains a single beam displacer 115. The single beam displacer 115 can be used to both separate the incoming light beam and combine the outgoing light beams, as discussed below. Additionally, the TODC 105B contains only two polarizing beam splitters 125. The second polarizing beam splitter 125B contains multiple interfaces where the beam can be directed. This allows for a more compact design, as a single polarizing beam splitter 125B can replace eight polarizing beam splitters 125A-H of FIG. 1A. Additionally, this allows for the use of fewer half-wave plates 135 and allows two quarter-wave plates 130A and 130B to replace the eight quarter-wave plates 130A-H of FIG. 1A.

Further, the TODC 105B contains GT etalon blocks 140A and 140B rather than individual GT etalons. The GT etalon blocks 140A and 140B can contain multiple GT etalons. For example, the GT etalon blocks 140A and 140B can contain six electrically tunable GT etalons each. The six GT etalons can be individually controlled with a pair of pins 150 that allow each of the six GT etalons to be individually tuned.

Figure 6A:
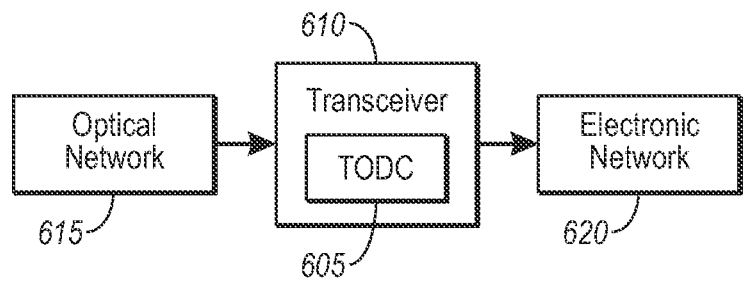
FIG. 6A illustrates an example of a block diagram of a tunable optical dispersion compensator integrated in a transceiver and connected at the receiver end of an optical network.
Figure 6B:
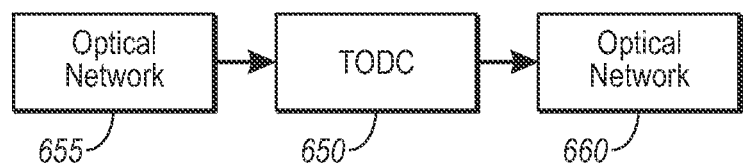
FIG. 6B illustrates an example of a block diagram of a tunable optical dispersion compensator connected in-line in an optical network.

The TODC can be connected to an optical network in-line, at the receiver end or at the transmitter end. One of skill in the art will recognize that the embodiments of FIGS. 6A and 6B illustrate only two of the many embodiments that can be configured to use the TODC as disclosed herein. Therefore, the embodiments of FIGS. 6A and 6B are to be considered for illustrative purposes only, and not by way of limitation.

FIG. 6A illustrates an example of a block diagram of a TODC 605 integrated in a transceiver 610 and connected at the receiver end of an optical network 615. Transceivers, such as the transceiver 610, can be used to convert optical signals to electrical signals and vice versa. Therefore, the TODC 605 can receive an optical signal from the optical network 615. The TODC 605 corrects the dispersion created in the optical network 615. The corrected optical signal is then converted by the transceiver 610 into an electrical signal and sent to an electronic network 620.

FIG. 6B illustrates an example of a block diagram of a TODC 650 connected in-line in an optical network 655 and 660. The TODC 650 receives an optical signal from the optical network 655. The TODC 650 corrects the dispersion created in the optical network 655. The corrected optical signal is then transmitted to optical network 660 where it can continue to its destination.

II. First Example of Dispersion Compensation Using a TODC

By way of example, and not by way of limitation, an example will be provided showing how a TODC can be used to compensate for dispersion of an optical signal sent through an optical network. This example can use the TODC 105A of FIG. 1A. Therefore, the example will be explained in relation to the TODC 105A of FIG. 1A. The TODC 105A produces a group delay (or dispersion) into an optical signal that is configured to be equal and opposite to the dispersion caused by the optical network, such that all wavelengths of light experience an equal amount of delay after passing through the network and TODC 105A.

In the example, light is received from the optical network at the first SF collimator 110A. The first SF collimator 110A collimates the light from an optical fiber into the TODC 105A. The light from the first SF collimator 110A enters the first beam displacer 115A and is divided into two beams of light. The first beam and the second beam are both linearly polarized, but their polarization states are orthogonal to one another. As the light exits the first beam displacer 115A the light encounters a first half-wave plate 135A, where the polarization state of the two beams remains linear, but the polarization state of the beams is changed from s-polarized to p-polarized and vice versa. The two beams pass through a first polarizing beam splitter 125I, Garnet 127 and a second half-wave plate 135B. The second half-wave plate 135B changes the polarization state back to their original polarization states (both beams are still linearly polarized and orthogonal to one another). For the sake of convenience, the linear polarization state of the first beam will be called "horizontal" or p-polarized while the orthogonal linear polarization state of the second beam will be called "vertical" or s-polarized.

Reference will now be made only to the polarization state of the first beam. One of ordinary skill in the art will recognize that the polarization state of the second beam remains orthogonal to the polarization state of the first beam. That is, when the first beam and the second beam are linearly polarized, the second beam is p-polarized when the first beam is s-polarized and vice versa. When the first beam and the second beam are circularly polarized, the second beam is right hand polarized when the first beam is circularly polarized and vice versa.

The two linearly polarized beams then encounter a second polarizing beam splitter 125A and a first quarter-wave plate 130A. In this direction, both beams are transmitted through the polarizing beam splitter 125A. The quarter-wave plate 130A changes the polarization state of the two beams from linearly polarized to circularly polarized. The first beam and the second beam enter a first GT etalon 140A where a group delay is produced in the first beam and the second beam. The first beam and the second beam are then reflected by the first GT etalon 140A and once again encounter the first quarter-wave plate 130A. The first quarter-wave plate 130A changes the beams from circularly polarized to linearly polarized. The first beam is now s-polarized. The first beam and the second beam then reenter the second polarization beam splitter 125A. The first beam and the second beam are reflected, or redirected, rather than transmitted, because their polarization state is linear rather than circular. The two beams are then transmitted through a third half-wave plate 135C. The third half-wave plate 135C changes the direction of polarization of the two beams. That is the polarization remains linear, however, the first beam is changed from s-polarized to p-polarized.

The first beam and the second beam then encounter a third polarizing beam splitter 125B and a second quarter-wave plate 130B. Both beams are transmitted through the polarizing beam splitter 125B. The second quarter-wave plate 130B changes the polarization state of the beams from linearly polarized to circularly polarized. The first beam and the second beam enter a second GT etalon 140B where additional group delay is produced in the first beam and the second beam. The first beam and the second beam are reflected by the second GT etalon 140B and once again encounter the second quarter-wave plate 130B. In this direction, the second quarter-wave plate 130B changes the beams from circularly polarized to linearly polarized. The first beam is now s-polarized. The first beam and the second beam then reenter the third polarization beam splitter 125B. The first beam and the second beam are reflected, or redirected, rather than transmitted, because their polarization state is linear rather than circular. The two beams are then transmitted through a fourth half-wave plate 135D. The third half-wave plate 135D changes the direction of rotation of the two beams. That is the polarization remains linear, however, the first beam is changed from s-polarized to p-polarized.

The first beam and the second beam continue through all eight GT etalons 140 where additional group delay is produced. As the first beam and the second beam are reflected from the eighth GT etalon 140H they encounter the eighth quarter-wave plate 130H which, in this direction, changes the circularly polarized beams into linear polarized beams. The first beam is now s-polarized. The first beam and the second beam enter the ninth polarizing beam splitter 125H and are reflected, or redirected. The first beam and the second beam exit the ninth polarizing beam splitter 125H and encounter a mirror 145, where the first beam and the second beam are reflected, and return along the optical path 120.

Note that the first beam and the second beam did not pass a half-wave plate after exiting the ninth polarizing beam splitter 125H. Therefore, the first beam remains s-polarized before encountering the mirror 145. The mirror 145 can change the polarization state from linear to circular. In some implementations the mirror 145 can leave the polarization unchanged. And the polarizing beam splitters 125 can be configured to reflect beams with linear polarization in one direction and let beams with linear polarization pass in the other direction. The first beam and the second beam return to the ninth polarizing beam splitter 125H are again reflected, or redirected, in the ninth polarizing beam splitter 125H. The first beam and the second beam then encounter the eighth quarter-wave plate 130H. The eighth quarter-wave plate 130H changes the polarization state from circularly polarized to linearly polarized.

The first beam and the second beam reenter the eighth GT etalon 140H. The first beam and the second beam are reflected in the eighth GT etalon 140H and encounter the quarter-wave plate 130H. The quarter-wave plate 130H changes the polarization state of the first beam and the second beam from linear to circular. The first beam and the second beam then pass through the polarizing beam splitter 125H and continue back along the optical path 120, encountering the GT etalons 140 a second time where additional group delay is produced.

After exiting the first GT etalon 140A a second time the first beam and the second beam are linearly polarized. The beams encounter the first quarter-wave plate 130A where the polarization state is changed to circular polarization. The circularly polarized beams are transmitted through the second polarizing beam splitter 125A and encounter the second half-wave plate 135B and the Garnet 127. The second half-wave plate 135B leaves the beams circularly polarized (the orientation has changed, but the polarization remains circular). The circularly polarized beams enter the first polarizing beam splitter 125I, where they are now reflected, or redirected.

The circularly polarized first beam and second beam enter the tenth polarizing beam splitter 125J and are reflected, or redirected. The first beam and the second beam then pass through a tenth half-wave plate 135J and enter a second beam displacer 115B. The tenth half-wave plate 135J leaves the beams circularly polarized, but leaves changes the orientation of the polarization. The second beam displacer 115B combines the first beam and the second beam into an output optical signal. The output optical signal enters a second SF collimator 110B where the output optical signal is collimated onto an optic fiber to be output from the TODC 105A to the optical network.

As a result, a total group delay has been produced. The TODC produces a group delay (or dispersion) into an optical signal that is configured to be equal and opposite to the dispersion caused by the optical network, such that all wavelengths of light experience an equal amount of delay after passing through the network and TODC. I.e. the dispersion has been reduced or eliminated.

III. Second Example of Dispersion Compensation Using a TODC

By way of example, and not by way of limitation, a second example will be provided showing how a TODC can be used to compensate for dispersion of an optical signal sent through an optical network. This example can use the TODC 105B of FIG. 1B. Therefore, the example will be explained in relation to the TODC 105B of FIG. 1B. The TODC 105B produces a group delay (or dispersion) into an optical signal that is configured to be equal and opposite to the dispersion caused by the optical network, such that all wavelengths of light experience an equal amount of delay after passing through the network and TODC 105B.

In the example, light is received from the optical network at the first SF collimator 110A. The first SF collimator 110A collimates the light from an optical fiber into the TODC 105B. The light from the first SF collimator 110A enters the beam displacer 115 and is divided into two beams of light. The first beam and the second beam are both linearly polarized, but their polarization states are orthogonal to one another. As the light exits the first beam displacer 115 the light encounters a first half-wave plate 135A, where the polarization state of the two beams remains linear, but the polarization state of the beams is changed from s-polarized and p-polarized and vice versa. The two beams pass through a first polarizing beam splitter 125A and encounter a first mirror 145A and a second mirror 145B which redirect the optical path 120. The first and second beam pass through a Garnet 127 and a second half-wave plate 135B. The second half-wave plate 135B changes the polarization state back to their original polarization states (both beams are still linear and orthogonal to one another).

For the sake of convenience, the linear polarization state of the first beam will be called "horizontal" or p-polarized while the orthogonal linear polarization state of the second beam will be called "vertical" or s-polarized.

Reference will now be made only to the polarization state of the first beam. One of ordinary skill in the art will recognize that the polarization state of the second beam remains orthogonal to the polarization state of the first beam. That is, when the first beam and the second beam are linearly polarized, the second beam is p-polarized when the first beam is s-polarized and vice versa. When the first beam and the second beam are circularly polarized, the second beam is right hand polarized when the first beam is circularly polarized and vice versa.

The two linearly polarized beams then encounter a first polarizing beam splitter 125A. The first and second beam are directed downward through a quarter-wave plate 130A toward the first GT etalon block 140A. The first quarter-wave plate 130A changes the polarization of the two beams from linearly polarized to circularly polarized. The first beam and the second beam enter the first GT etalon block 140A where a group delay is produced in the first beam and the second beam. The first beam and the second beam are then reflected by the first GT etalon block 140A and once again encounter the first quarter-wave plate 130A. The first quarter-wave plate 130A changes the beams from circularly polarized to linearly polarized. The first beam is now s-polarized. The first beam and the second beam then reenter the second polarization beam splitter 125B.

The first beam and the second beam pass through the second polarization beam splitter 125B and pass through a second quarter-wave plate 130B and a second GT etalon block 140B. The second quarter-wave plate 130B changes the polarization of the two beams from linearly polarized to circularly polarized. The first beam and the second beam enter the second GT etalon block 140B where a group delay is produced in the first beam and the second beam. The first beam and the second beam are then reflected by the second GT etalon 140B and once again encounter the second quarter-wave plate 130B. The second quarter-wave plate 130B changes the beams from circularly polarized to linearly polarized. The first beam is now p-polarized. The first beam and the second beam then reenter the second polarization beam splitter 125B.

In this direction, the first beam and second beam are reflected, or redirected, to the right (as shown in FIG. 1B) rather than transmitted. The first and second beam are again directed downward through the quarter-wave plate 130A toward the first GT etalon block 140A. The process continues until the first and second beams are reflected by the third mirror 145C. The first and second beam then return along the optical path 120, passing through the GT etalon blocks 140A and 140B and introduction further group delay.

The first and second beam eventually return to the first polarization beam splitter 125A. In this direction the first and second beam are directed through the third half-wave plate 135C into the beam displacer 115. The beam displacer 115 combines the first beam and the second beam into an output optical signal. The output optical signal enters a second SF collimator 110B where the output optical signal is collimated onto an optic fiber to be output from the TODC 105A to the optical network.

IV. Method of Compensating for Dispersion

Figure 7:
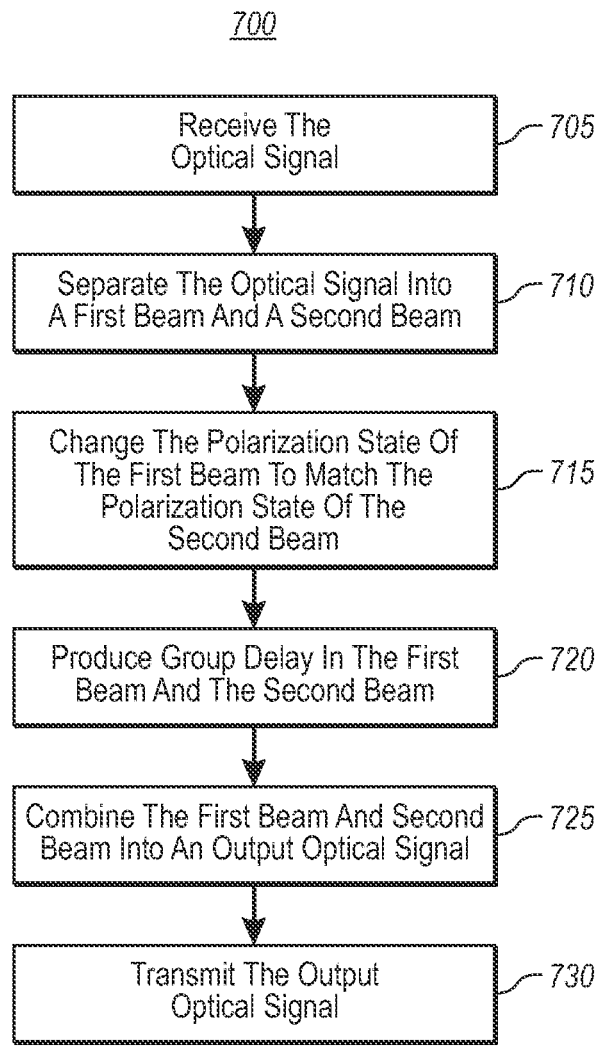
FIG. 7 is a flow diagram illustrating a method for compensating for dispersion in an optical signal.

FIG. 7 is a flow diagram illustrating a method 700 for compensating for dispersion in an optical signal. The method 700 may be used to compensate for dispersion using the TODC 105 of FIGS. 1A and 1B; therefore, the method 700 will be explained in relation to the TODC 105 of FIGS. 1A and 1B. Note, however, that the TODC 105 of FIGS. 1A and 1B is only one of many ways to implement the method 700. Also note that the method can be performed in an optical network in-line, at the receiver end or at the transmitter end.

The method 700 includes receiving the optical signal 705. The optical signal may be received at a SF collimator, such as the first SF collimator 110A. A collimator is a device that narrows a beam of particles or waves. To "narrow" can mean either to cause the directions of motion to become more aligned in a specific direction (i.e. parallel) or to cause the spatial cross section of the beam to become smaller. In some embodiments, the first SF collimator 110A can focus an optical signal from an optical fiber to another medium, such as air.

The method 700 also includes separating the optical signal into a first beam and a second beam 710. The optical signal may be separated using a beam displacer, such as the first beam displacer 115A. A beam displacer can separate the input optical signal into two beams with different polarizations which exit parallel to one another. In some embodiments, the first beam will be linearly polarized and the second beam will be circularly polarized. In other embodiments, the first beam will be circularly polarized and the second beam will be linearly polarized. When separating the input optical signal, the first beam can transmit straight through the first beam displacer 115A, while the second beam can transmit through the first beam displacer 115A at an angle with the first beam and emerge parallel to the first beam. The amount of beam displacement (the distance between the first beam and the second beam) can vary with wavelength. The beam displacer 115A can be oriented with the entrance face and the exit face parallel to one another and inclined at some angle to the optic axis of the beam displacer to maximize the amount of displacement.

The method 700 further includes changing the polarization state of the first beam to match the polarization state of the second beam 715. I.e. if the first beam is linearly polarized, the polarization state of the first beam is changed to circular polarization; and if the first beam is circularly polarized, the polarization state of the first beam is changed to linear polarization. The polarization states of the first beam can be changed using a half-wave plate, such as the first half-wave plate 135A. A wave plate, or retarder, is an optical device that alters the polarization state of a light wave travelling through the wave plate. A wave plate works by shifting the phase of the light wave between two perpendicular polarization components. A typical wave plate can be a birefringent crystal with a carefully chosen orientation and thickness. For example, a quarter-wave plate creates a quarter-wavelength phase shift and can change linearly polarized light to circularly polarized light and vice versa. Another type of wave plate is a half-wave plate, which retards one polarization by half a wavelength, or 180 degrees. I.e., a half-wave plate rotates the polarization direction of polarized light (change the direction of linearly polarized light or the rotation of circularly polarized light). Wave plates can be unidirectional; i.e. a wave plate can change polarization when light is traveling in one direction, and leave the polarization unchanged when light is travelling in the opposite direction.

The method 700 also includes producing group delay in the first beam and the second beam 720. The group delay can be produced using a series GT etalons, such as the GT etalons 140. In some embodiments, a GT etalon is a transparent plate with two reflecting surfaces, one of which has very high reflectivity. Due to multiple-beam interference, light incident on the lower-reflectivity surface of a GT etalon is (almost) completely reflected, but has a phase shift that depends strongly on the wavelength of the light. Additionally, GT etalons may be tunable. That is, the wavelengths around which the maxima occur and/or the FSR can be adjusted. There are a number of ways to tune etalons including tilting the entire etalon, moving the mirrors and changing the refraction index of the medium (using pressure, temperature, electrostatic or other means) and other methods. Tilt tuning is a simple tuning technique, as the etalon is tilted the FSR changes with the cosine of the angle. However, the output of the etalon can be smeared by tilting since each successive "bounce" is moved laterally along the etalon. Other tuning techniques can maintain a plane parallel structure and change the effective length of the etalon. In some embodiments, this can be done by using a piezoelectric spacer in an air spaced etalon to change the spacing of the etalon. In other embodiments, tuning may be thermal and the tuning may involve changing the refractive index of the medium, the spacing or both.

If the GT etalons are tunable, then the group delay can be configured to eliminate the chromatic dispersion of the optical signal. I.e., the group delay can be configured to be equal and opposite to the dispersion of the optical signal. E.g., in a highly simplified example, consider an optical signal composed of two wavelengths transmitted over an optical network. If the first optical signal is delayed more than the second optical signal in the optical network, the GT etalons can be configured to delay the second optical signal more than the first signal. If the amount of delay is configured correctly, the total delay of both signals can be equal, thus eliminating the dispersion. In the same way, a series of GT etalons can eliminate dispersion of an optical signal where the wavelength of the signal varies slightly around the central wavelength of the signal. E.g., if a single GT etalon removes a portion of the dispersion in an optical signal, a series of GT etalons can be used to eliminate all dispersion, because the group delay of the individual GT etalons add linearly.

The light can be directed form one GT etalon to the next using polarizing beam splitters and quarter-wave plates, such as polarizing beam splitters 125 and quarter-wave plates 130. Polarizing beam splitters (or beam splitting polarizers), such as the Wollaston prism, use birefringent materials, splitting light into beams of differing polarization. For an ideal polarizing beam splitter these would be fully polarized, with orthogonal polarizations. Beam splitting polarizers do not need to absorb and dissipate the energy of the rejected polarization state; therefore beam splitting polarizers can be more suitable for use with high intensity beams, such as laser light, than other polarizers. True polarizing beam splitters can also be useful where the two polarization components are to be analyzed or used simultaneously. Polarizing beam splitters can be used to selectively transmit a beam or reflect, or redirect, the beam if the beam has single polarization state (linear or circular). That is, a single polarizing beam splitter can be used to transmit a linearly polarized beam and to reflect, or redirect, a circularly polarized beam or vice versa.

Quarter-wave plates can change the polarization of a beam of light from linear to circular or vice versa. Changing the polarization of a beam can make a beam that was previously transmitted through a polarizing beam splitter be reflected, or redirected, on subsequent encounters with the polarizing beam splitter. Likewise, changing the polarization of a beam can make a beam that was previously reflected, or redirected, at a polarizing beam splitter be transmitted on subsequent encounters with the polarizing beam splitter.

The method 700 further includes combining the first beam and the second beam into an output optical signal 725. The first beam and the second beam can be combined using a beam displacer, such as the second beam displacer 115B. A beam displacer can combine two beams with different polarizations which enter parallel to each other into an output optical signal. When combining a beam, the first beam can transmit straight through while the second beam can transmit through the beam displacer at an angle with the first beam and emerge combined with the first beam. The amount of beam displacement (the distance between the first beam and the second beam) can vary with wavelength. Beam displacers can be oriented with the entrance face and the exit face parallel to one another and inclined at some angle to the optic axis of the beam displacer to maximize the amount of displacement.

The method 700 also includes transmitting the output optical signal 730. The optical signal may be transmitted using a SF collimator, such as the second SF collimator 110B. A collimator is a device that narrows a beam of particles or waves. To "narrow" can mean either to cause the directions of motion to become more aligned in a specific direction (i.e. collimated or parallel) or to cause the spatial cross section of the beam to become smaller. In some embodiments, the second SF collimator 110B can focus an optical signal from a medium, such as air, onto an optical fiber.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A tunable optical dispersion compensator comprising:
a first beam displacer on an optical path, wherein the first beam displacer separates an input optical signal into a first beam and a second beam;
a first half-wave plate attached to the first beam displacer and located in the optical path of both the first beam and the second beam;
a first polarizing beam splitter including a garnet and a second half-wave plate on the optical path, wherein the optical path from the first beam displacer through the first half-wave plate and the first polarization beam splitter is linear in a first direction;
two or more component sets cascaded together on the optical path, wherein each of the two or more component sets includes:
a collinearly-located polarization beam splitter;
a collinearly-located quarter-wave plate attached to the collinearly-located polarization beam splitter;
a collinearly-located etalon;
an orthogonally-located half-wave plate attached to the collinearly-located polarization beam splitter;
an orthogonally-located polarization beam splitter;
an orthogonally-located quarter-wave plate attached to the orthogonally-located polarization beam splitter; and
an orthogonally-located etalon;
wherein:
the collinearly-located polarization beam splitter, the collinearly-located quarter-wave plate, and the collinearly-located etalon are collinearly aligned with each other parallel to the first direction and either collinear with the first beam displacer, the first half-wave plate, and the first polarization beam splitter or collinear with the orthogonally-located polarization beam splitter of a preceding one of the two or more component sets; and the collinearly-located polarization beam splitter, the orthogonally-located half-wave plate, the orthogonally-located polarization beam splitter, the orthogonally-located quarter-wave plate, and the orthogonally-located etalon are collinearly aligned with each other orthogonal to the first direction;

wherein the collinearly-located and orthogonally-located etalons in the two or more component sets are tunable and produce a group delay in the first beam and the second beam;

a reflecting mirror on the optical path collinearly aligned parallel to the first direction with the orthogonally-located polarization beam splitter of a last one of the two or more component sets, wherein the reflecting mirror returns the optical signal back along the optical path; and a second beam displacer on the optical path and positioned to receive the first beam and the second beam after reflection by the first polarization beam splitter in a direction orthogonal to the first direction, wherein the second beam displacer combines the first beam and the second beam into an output optical signal.

2. A tunable optical dispersion compensator according to claim 1, wherein the first beam displacer and the second beam displacer include polarizing beam displacers.

3. A tunable optical dispersion compensator according to claim 1, wherein the two or more component sets comprise four component sets such that the tunable optical dispersion compensator comprises four collinearly-located polarization beam splitters, four orthogonally-located polarization beam splitters, four collinearly-located etalons, and four orthogonally-located etalons.

4. A tunable optical dispersion compensator according to claim 1, wherein the group delay introduced by the collinearly-located and orthogonally-located etalons is configured to compensate for dispersion in the input optical signal.

5. A tunable optical dispersion compensator according to claim 1, wherein the collinearly-located and orthogonally-located etalons include one or more Gires-Tournois etalons.

6. A tunable optical dispersion compensator according to claim 5, wherein the one or more Gires-Tournois etalons are thermally tunable.

7. A tunable optical dispersion compensator according to claim 5, wherein the one or more Gires-Tournois etalons are electronically tunable.

8. A tunable optical dispersion compensator according to claim 7, wherein the one or more Gires-Tournois etalons include lead magnesium niobate-lead titanate crystals.

9. A tunable optical dispersion compensator according to claim 5, comprising two or more Gires-Tournois etalons, wherein the two or more GiresTournois etalons have equal free spectral range and group delay curves.

10. A tunable optical dispersion compensator according to claim 1, further comprising:
a first single fiber collimator, wherein the first single fiber collimator receives the input optical signal; and
a second single fiber collimator, wherein the second single fiber collimator transmits the output optical signal.

11. A transceiver comprising the tunable optical dispersion compensator according to claim 1.

12. A tunable optical dispersion compensator according to claim 1, wherein the tunable optical dispersion compensator is configured to be connected in-line to a 10 Gb/s optical network.

13. A tunable optical dispersion compensator according to claim 1, wherein the tunable optical dispersion compensator is configured to be connected at the receiver end of a 40 Gb/s optical network.

14. A method of compensating for chromatic dispersion of an optical signal, the method comprising the following sequential acts:
receiving the optical signal;
separating the optical signal into a first beam and a second beam, the polarization state of the first beam being different than the polarization state of the second beam;
rotating the polarization direction of the first beam to match the polarization state of the second beam;
producing group delay in the first beam and the second beam by directing the first beam and the second beam through a plurality of Gires-Tournois etalons included in two or more component sets cascaded together, including for each of the two or more component sets:
directing the first beam and the second beam through a collinearly-located polarization beam splitter, a collinearly-located quarter-wave plate attached to the collinearly-located polarization beam splitter, and a collinearly-located Gires-Tournois etalon that are collinearly aligned with each other parallel to a first direction;
reflecting the first beam and the second beam from the collinearly-located Gires-Tournois etalon back through the collinearly-located quarter-wave plate to the collinearly-located polarization beam splitter;
redirecting the first beam and the second beam from the collinearly-located polarization beam splitter through an orthogonally-located half-wave plate attached to the collinearly-located polarization beam splitter, an orthogonally-located polarization beam splitter, an orthogonally-located quarter-wave plate attached to the orthogonally-located polarization beam splitter and an orthogonally-located Gires-Tournois etalon that are all collinearly aligned with each other orthogonal to the first direction;
reflecting the first beam and the second beam from the orthogonally-located Gires-Tournois etalon back through the orthogonally-located quarter-wave plate to the orthogonally-located polarization beam splitter; and
redirecting the first beam and the second beam from the orthogonally-located polarization beam splitter:
through a collinearly-aligned half-wave plate attached to the orthogonally-located polarization beam splitter and through the collinearly-located polarization beam splitter, collinearly-located quarter-wave plate, and collinearly-located Gires-Tournois etalon of a next one of the two or more component sets; or
to a reflecting mirror to be reflected back through the two or more component sets, wherein the group delay is configured to compensate for the chromatic dispersion of the optical signal;
combining the first beam and the second beam into an output optical signal; and
transmitting the output optical signal.

15. A method according to claim 14, wherein the method of compensating for chromatic dispersion is performed in-line in an optical network or at a receiver end of an optical network.

16. A method according to claim 14, wherein the group delay produces a phase shift that is wavelength dependent.

17. A method according to claim 14, wherein:
the optical signal is received at a first single fiber collimator; and
the optical signal is transmitted at a second single fiber collimator.

18. A method according to claim 14, wherein:
the optical signal is separated into the first beam and the second beam at a first beam displacer that is collinearly aligned with the collinearly-located polarization beam splitter, the collinearly-located quarter-wave plate, and the collinearly-located Gires-Tournois etalon of a first one of the two or more component sets; and
the first beam and the second beam are combined into the output optical signal at a second beam displacer.

19. A method according to claim 14, wherein the group delay is produced in the collinearly-located and orthogonally-located Gires-Tournois etalons.

20. A tunable optical dispersion compensator according to claim 7, wherein each of the collinearly-located and orthogonally-located Gires-Tournois etalons comprise a pair of pins that allow each of the collinearly-located and orthogonally-located Gires-Tournois etalons to be individually tuned.

\* \* \* \* \*